United States Patent [19]

Soteropulos et al.

[11] 3,931,702
[45] Jan. 13, 1976

[54] MACHINE FOR FORMING CYLINDRICAL HAY BALES

[75] Inventors: Gust Soteropulos; Gerald Franklyn Meiers, both of Ottumwa, Iowa

[73] Assignee: Deere & Company, Moline, Ill.

[22] Filed: July 17, 1974

[21] Appl. No.: 489,349

[52] U.S. Cl. .................................. 56/341; 100/88
[51] Int. Cl.² .......................................... A01D 39/00
[58] Field of Search ........................... 56/341–343, 56/344–346; 100/88

[56] References Cited
UNITED STATES PATENTS

| | | | |
|---|---|---|---|
| 3,722,197 | 3/1973 | Vermeer | 56/341 |
| 3,815,345 | 6/1974 | Mast et al. | 56/341 |
| 3,837,159 | 9/1974 | Vermeer | 56/341 |

*Primary Examiner*—Russell R. Kinsey

[57] ABSTRACT

A machine for forming large cylindrical bales of hay or the like has a mobile main frame with opposite upright sides defining a baling chamber therebetween. A windrow pickup unit removes the crop from the field and delivers it rearwardly between a pair of compressor rolls, which deliver the crop material in a mat to a baling zone between upper and lower endless conveyors, the lower conveyor having a generally horizontal upper run which supports the underside of the bale and the upper conveyor having an upwardly and forwardly moving lower run which engages the crop moving rearwardly on the lower conveyor to roll it into a bale. The upper conveyor envelops the bale as it is formed and a rear gate assembly is provided in association with the upper conveyor for permitting rearward discharge of the formed bale, the gate assembly including a pair of vertically swingable upper arms and vertically swingable lower arms carried by the upper arms, a linkage being provided between the lower arms and the frame to control the movement of an upper conveyor roller extending between the lower ends of the lower arms, which defines the rearward end of the baling chamber as the bale is being formed.

11 Claims, 6 Drawing Figures

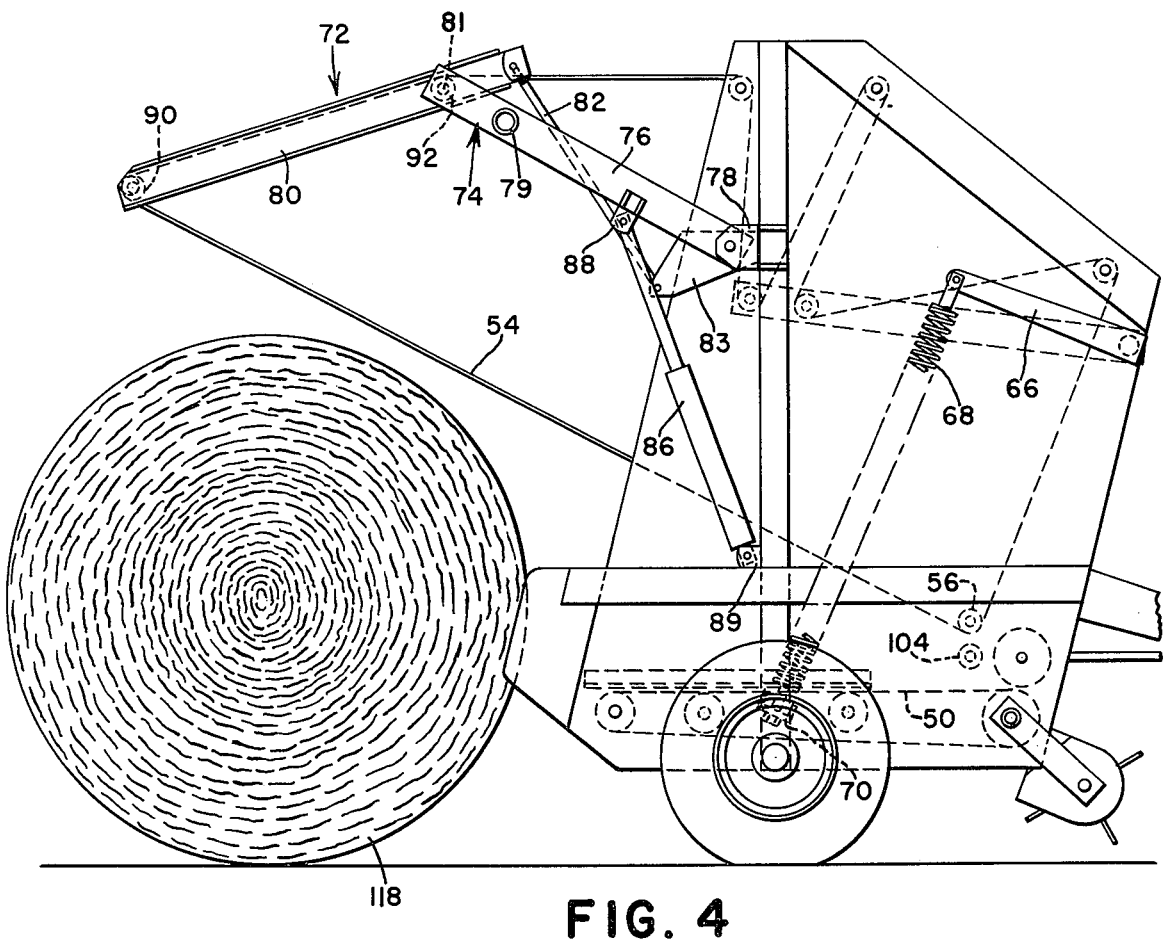
FIG. 4
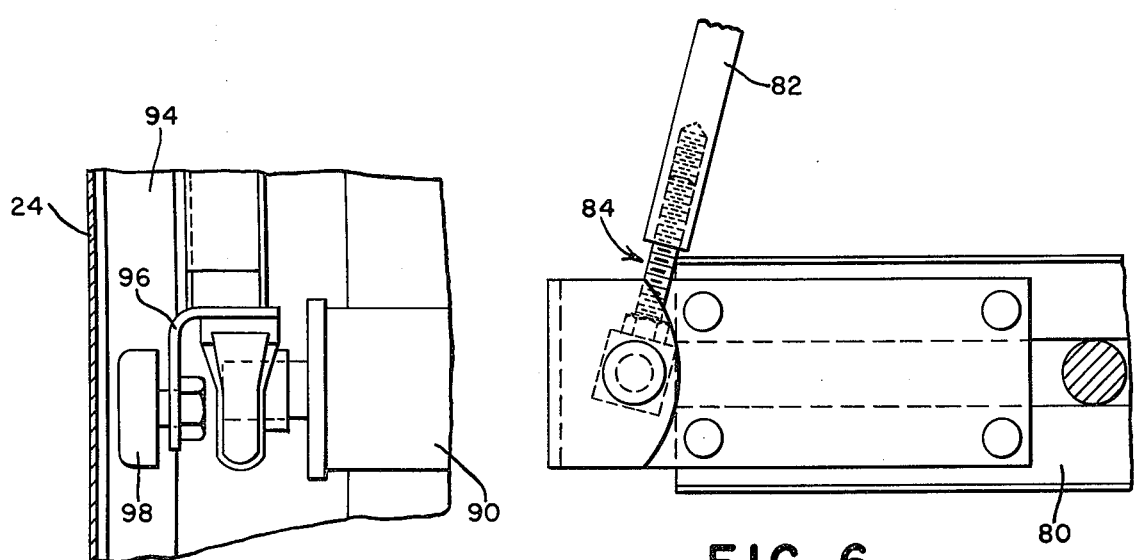
FIG. 5
FIG. 6

MACHINE FOR FORMING CYLINDRICAL HAY BALES

BACKGROUND OF THE INVENTION

This invention relates to a machine for forming cylindrical bales of crop material such as hay or the like, and more particularly to an improved machine of the above general type wherein the bale is formed off the ground between upper and lower conveyors and discharged rearwardly after the bale is formed Machines of the above general type have been known for a long period of time, and numerous, now expired patents disclose cylindrical balers having crop pickups which deliver the crop rearwardly between a pair of compressor rolls to a baling zone between a pair of belt-type conveyors moving around transverse rollers, the bale being supported above the ground on the lower conveyor while the upper conveyor envelops at least a part of the upper portion of the bale to rotate the bale and roll the mat of crop material moving between the compressor rolls into an increasingly larger bale. After the bale reaches a predetermined size, means are provided for rearwardly discharging the bale onto the ground. The early commercial machines embodying the above bale-forming mechanism produced relatively small bales that could be manually lifted, but with the decreasing availability of farm labor and the increasing availability of material-handling machines, later commercial machines have provision for the formation of much larger bales that can only be handled by mechanically powered material-handling equipment. Several machines of the latter type are now commercially available, U.S. Pat. No. 3,722,197 illustrating one type of the larger baling machines now commercially available.

SUMMARY OF THE INVENTION

According to the present invention, there is provided an improved machine for forming large cylindrical bales of the above general type, wherein the bale is formed off the ground in a baling zone between two conveyors. More specifically, the baler is provided with an improved rear gate assembly having a transverse roller that defines a rearward end of the baling zone and about which the upper conveyor moves. The rear gate assembly is so constructed that the roller moves rearwardly in close proximity to the upper run of the lower conveyor as the bale grows and then swings upwardly and rearwardly when the gate assembly is actuated to permit discharge of the formed bale. Another feature of the invention resides in the provision of guides or tracks on opposite sides of the baling chamber which are engaged by followers on the lower end of the gate assembly to control the movement of the lower end of the gate assembly and the roller mounted thereon.

Another feature of the improved baler resides in the provision of a transverse roller adjacent to the upper conveyor at the forward end of the baling zone to strip the upper conveyor at the forward end of the baling zone and prevent the forward loss of material from the baling zone due to the motion of the upper conveyor. The stripper roller is much simpler and less expensive than devices accomplishing the above result on earlier machines.

Still another feature of the invention resides in the simple and rugged construction of the machine frame as opposed to a more complicated frame structure of earlier machines.

BRIEF DESCRIPTION OF THE DRAWINGS

FIG. 4 is a view similar to FIG. 3, but showing machine just subsequent to the discharge of a formed bale.

FIG. 5 is a plan view of one end of the lower rear roller, which is mounted on the end of the gate assembly, showing the track and follower for guiding the lower end of the gate assembly.

FIG. 6 is an enlarged side elevation showing the adjustable link connecting the lower arm of the gate assembly to the main frame.

DESCRIPTION OF THE PREFERRED EMBODIMENT

Figure 1:
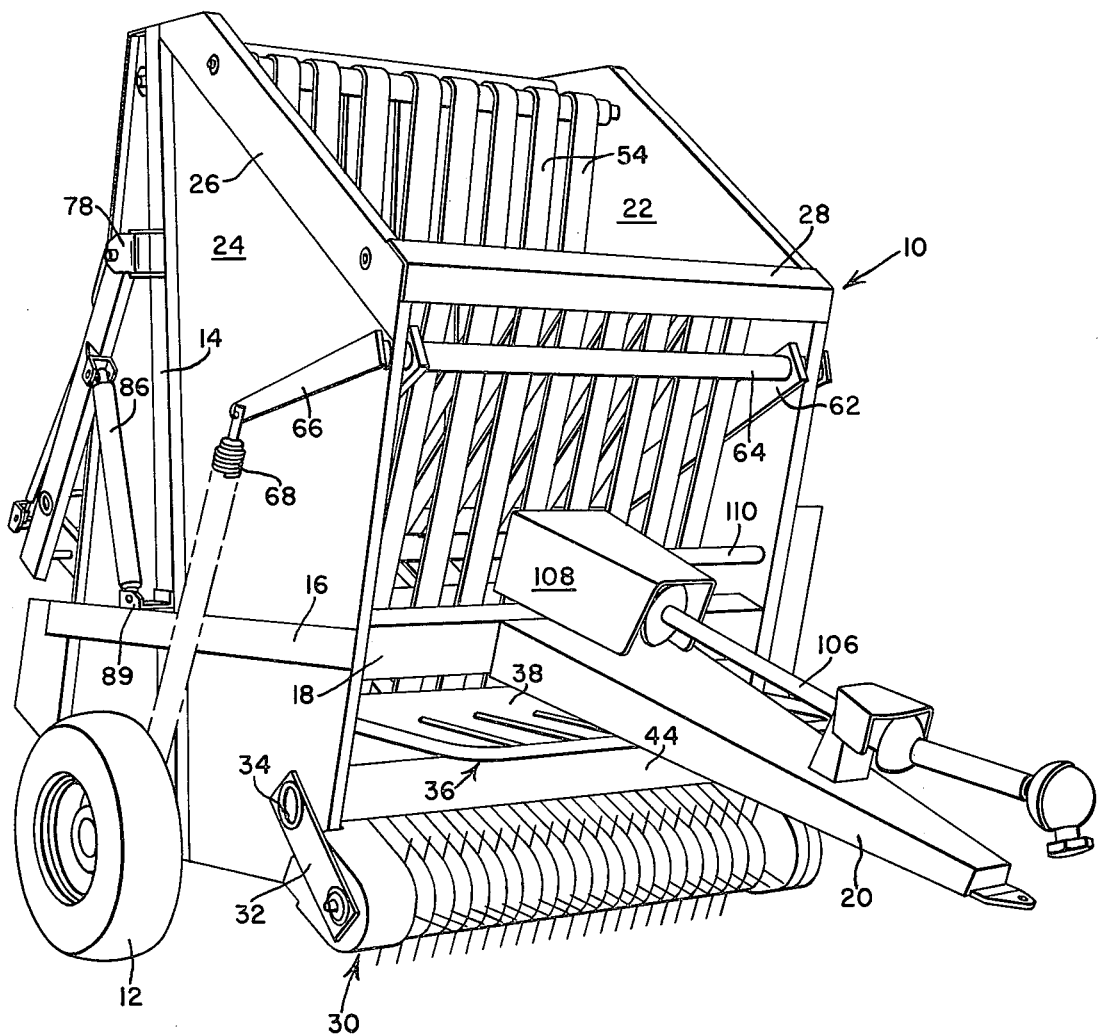
FIG. 1 is a right front perspective view of the improved machine for forming large cylindrical bales in a non-operating condition.

The invention is embodied in a machine that includes a mobile main frame, indicated generally by the numeral 10, the frame being mounted on a pair of wheels 12 on opposite sides of the frame. The main frame includes a pair of upright frame members 14 extending upwardly from a transverse axle structure 15 for the wheels 12, the upright frame members being respectively disposed immediately interiorally of the respective wheels at opposite sides of the machine. A pair of generally fore and aft frame members 16 respectively intersect and are connected to the upright frame members 14 to form inverted T-shaped frames on opposite sides of the machine, and a transverse frame member 18 spans the width of the machine and connects the forward ends of the fore and aft members 16. An implement tongue 20 extends forwardly from the center of the transverse frame member for connection to a towing vehicle in the conventional manner.

A pair of upright, fore and aft side panels or walls 22 and 24 are respectively connected to the inner sides of the opposite upright frame members 14 and the opposite fore and aft frame members 16, the side walls or panels 22 and 24 forming the opposite sides of a baling chamber within the machine. As is apparent from FIG. 4, the side panels 22 and 24 are generally in the shape of an upwardly and forwardly inclined parallelogram with the upper front corners truncated, and a pair of downwardly and forwardly inclined frame members 26 respectively extend from the upper ends of the upright frame members 14 along the upper forward side of the respective side panels. An upper transverse beam 28 interconnects the forward ends of the inclined frame members 26.

A pickup mechanism, indicated generally by the numeral 30, is of the well known type utilized on balers and the like for picking up crop material laying in a windrow and will not be described in detail. The pickup mechanism is mounted on the main frame by a pair of generally fore and aft arms 32 having their rearward ends pivoted to the main frame by transversely aligned pivots 34 to permit vertical swinging adjustment of the pickup mechanism about the axis of the pivots 34. A generally U-shaped horizontally disposed finger type compressor mechanism 36 has its opposite ends connected to the opposite sides of the main frame and extends forwardly therefrom over the pickup mechanism, such compressors also being well known and functioning to limit the upward movement of the crop after it is thrown upwardly and rearwardly by the pickup mechanism.

A pair of vertically spaced, transversely extending, oppositely rotating compressor rolls 38 and 40 extend between the opposite side panels 22 and 24 immediately to the rear of the pickup mechanism. The upper compressor roll 38 rotates in a clockwise direction, and the lower roll 40 rotates in a counterclockwise direction as viewed in FIG. 2. As is apparent in FIG. 2, the pickup mechanism elevates the crop laying in a windrow, indicated by the numeral 41 in FIG. 2, and delivers it upwardly and rearwardly to the bite of the compressor rolls 38 and 40, which engage the crop and pass it rearwardly between the rolls in a mat, indicated by the numeral 42.

The mat of crop material leaving the compressor rolls 38 and 40 is deposited on top of a lower conveyor means, indicated generally by the numeral 43. The lower conveyor means is formed by an endless flexible belt 44 which spans the width of the baling chamber and is trained around the lower compressor roll 40 and a rear roller 46 which also extends between the opposite side panels adjacent the lower rear corner thereof. A pair of intermediate rollers 47 and 48 also extend between the opposite side panels and engage the underside of the upper run 50 of the belt, the rollers 46, 47 and 48 being parallel to and lying in substantially the same horizontal plane as the lower compressor roll so that the upper run 50 of the belt 44 is substantially horizontal.

An upper conveyor, indicated generally by the numeral 52, is also disposed between the opposite side panels and includes a plurality of side by side endless flexible belts 54, which are transversely spaced a relatively small distance apart and extend side by side across the width of the baling chamber. The belts 54 are trained around a transverse lower front roller 56, which extends between the opposite side panels rearwardly of the upper compressor roll 38, an upper front roll 57, which extends between the side panels adjacent the upper forward corner thereof, and a pair of upper rear rollers 58 and 59, which extends between the opposite side panels adjacent the upper rear corner thereof on opposite sides of the upper end of the upright frame members 14. The rollers 56, 57, 58 and 59 all rotate about fixed transverse axes and engage the inner side of the belts 54. A pair of axially transverse idler rollers 60 and 61 are mounted on and extend between the rearward ends of a pair of generally fore and aft arms 62 having their forward ends mounted on a transverse pivot shaft 64, which extends between the opposite side panels immediately below the upper transverse beam 28, the arms 62 being respectively disposed immediately adjacent to the interior sides of the opposite side panels 22 and 24. A pair of spring arms 66 are respectively connected to the opposite ends of the pivot shaft 64 on the exterior side of the side panels, and a pair of helical tension springs 68 extend between the rearward ends of the spring arms 66 and mounting brackets 70 on the upright frame members 14. As is apparent, the springs 68 exert a counterclockwise biasing force on the shaft 64, as viewed in FIG. 2, which in turn biases the arms 62 downwardly, the rollers 60 and 61 engaging the exterior sides of the belts 54 on opposite sides of the fixed roller 58.

A rear gate assembly indicated generally by the numeral 72 allows the rearward discharge of formed bales. The gate assembly includes a pair of identical arm assemblies 74 on opposite sides of the machine, only the arm assembly on the right side of the machine being shown and described in detail herein. The right hand arm assembly includes an upper arm 76 having its forward end swingably mounted on a transverse pivot 77 carried by a bracket 78 on the upright frame member 14. A transverse tube 79 connects the upper arms 76 of the two arm assemblies 74 so that the arm assemblies move in unison.

The arm assembly 74 also includes a lower arm 80 that is pivotally connected to the rearward end of the upper arm 76 by means of a transverse pivot 81, the lower arm being connected to the upper arm a short distance away from the upper end of the lower arm. A link 82 has one end pivotally connected to the upper end of the lower arm 80 and its opposite end pivotally connected to a bracket extension 83 on the bracket 78. As best seen in FIG. 6, an adjusting means 84 is provided at the connection between the link and the lower arm for selectively adjusting the effective length of the link, the adjusting means being in the form of a threaded member threadable into the end of the link. A hydraulic cylinder 86 is provided on each side of the machine and extends between a bracket 88 intermediate the opposite ends of the upper arm and a bracket 89 on the main frame adjacent the intersection of the frame members 14 and 16.

A lower rear transverse roller 90 extends between the lower ends of the lower arms 80, and a roller 92 extends between the lower arms 80 parallel to the roller 90 coaxial with the pivot connections between the upper and lower arms. The upper conveyor belts are also trained around the rollers 90 and 92.

Figure 2:
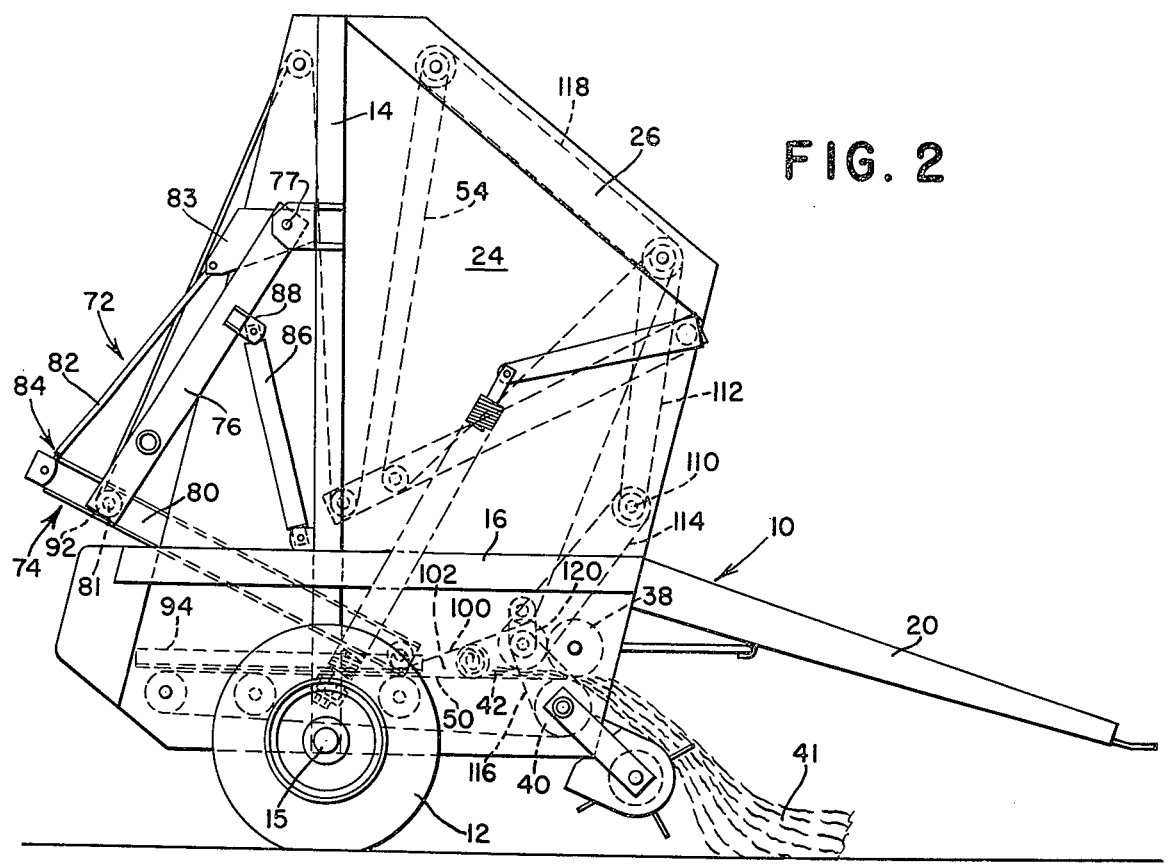
FIG. 2 is a partly schematic side elevation view of the machine as it is starting to form a bale.
Figure 3:
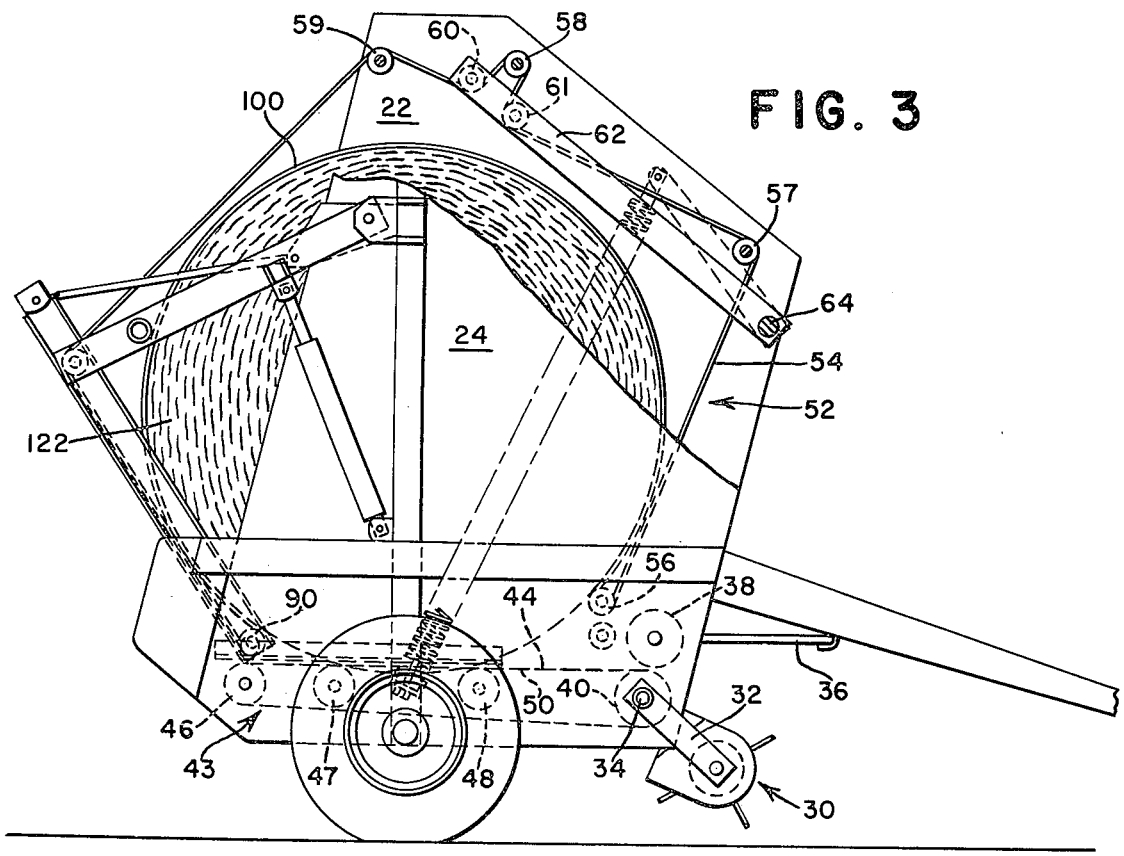
FIG. 3 is a view similar to FIG. 2, but with portions of the side of the machine removed to more clearly show the bale, which has reached its full size, just prior to discharge.

A pair of generally fore and aft guide tracks 94 are respectively mounted on the opposite side panels 22 and 24 immediately above the upper run 50 of the lower conveyor belt 46. As seen in FIG. 5, the lower ends of the lower arms 80 are provided with L-shaped brackets 96 which carry axially transverse rollers 98 that ride along the guide tracks 94. Thus, as the rear gate assembly swings rearwardly, the rollers 98 roll along the guide tracks 94 so that the lower ends of the lower arms and the rear roller 90 carried thereby move in a straight line immediately adjacent to and following the path of the upper run of the lower belt. The geometry of the gate assembly links 82 relative to the gate assembly arms is such that a generally linear movement of the lower ends of the lower arms is produced during the first portion of the rearward and upward movement of the gate assembly, the first portion of said movement accommodating the growth of the bale during the baling process. As shown in FIG. 2, the rear roller 90 is in its forwardmost position at the start of the baling process, wherein it is disposed at the forward end of the guide tracks 94, and is in its rearwardmost position at the end of the baling process as shown in FIG. 3. When the bale is completely formed, further rearward movement of the gate assembly from the position shown in FIG. 3 results in arcuate movement of the lower rear roller 90 to a rearward and upward position for discharge of the bale as shown in FIG. 4.

The upper run 50 of the lower convey moves rearwardly during the baling process, while the lower run of the upper conveyor, which is opposite the lower conveyor moves forwardly. The portion of the upper conveyor belts 54 extending between the rear roller 90 and the fixed lower front roller 56 is the bale engaging portion 100 of the upper conveyor. The area or zone between the upper run 50 of the lower conveyor and the bale engaging portion 100 of the upper conveyor defining a baling zone, identified by the numeral 102 in FIG. 2. As is apparent from FIG. 2, as the compressor rolls 38 and 40 feed the mat of material 42 into the baling zone 102 it is engaged by the two oppositely moving conveyors in such a manner that it starts to roll the material into a ball. The rear roller 90 defines the rearward end of the baling zone 102, and as the bale grows, the gate assembly swings rearwardly carrying the rear roller 90 rearwardly until it reaches the position shown in FIG. 3. A transverse stripper roller 104 extends between the opposite side panels immediately to the rear of the upper compressor roll 38 and immediately below the lower front roller 56 to strip crop material from the upper conveyor belts at the forward end of the baling zone 102, the stripper roller 104 being driven in a counterclockwise direction as viewed in FIG. 2.

The pickup and the conveyor rolls are driven from the towing vehicle, conventionally a tractor equipped with a power take-off mechanism, in the conventional manner, the baler being provided with a fore and aft driveshaft 106 above the tongue 20. The forward end of the driveshaft is connectible to the tractor power take-off mechanism, and the rearward end of the driveshaft provides the input for a bevel gearbox, which is disposed under appropriate shielding 108. The gearbox, in turn, drives a transverse driveshaft 110 extending toward the left side of the machine, and the transverse driveshaft is connected to the various driven components by conventional belt drives, some of which are schematically shown in FIG. 2, where there is shown an upper drive belt 112 between the driveshaft 110 and the fixed drive roller 57 of the upper conveyor, a belt drive 114 between the driveshaft and the stripper roller 104, a belt drive 116 between the stripper roller and the lower compressor roll 40, an upper belt drive 118 from the roller 57 to the roller 58, and a belt drive 120 from the stripper roller to the lower front roller 56, all of said rollers being driven in a counterclockwise direction. Of course, additional drives are provided for the pickup and the upper compressor roll.

In operation, as the machine advances across a field of windrowed crops, the pickup mechanism 30 raises the windrow 41 and moves it rearwardly to the compressor rolls 38 and 40, which deliver the crop rearwardly in a mat to the baling zone 102, where it is engaged by the rearwardly moving upper run 50 of the lower conveyor and the forwardly moving run 100 of the upper conveyor, as shown in FIG. 2. The oppositely moving belt runs tends to roll the hay into a roll, and the stripper roller 104 prevents the upper conveyor from expelling the crop material forwardly over the upper compressor roll 38. As the bale rolls, the size of the roll of hay in the baling zone increases, the bale being supported from below on the upper run of the lower conveyor while the upper conveyor substantially envelops the remainder of the bale. The increasing bale size, of course, requires additional length of the bale engaging run of the upper conveyor, the takeup mechanism provided by the idler rollers 60 and 61, which are spring loaded against the outside of the belt, providing the necessary belt length and tension for the compression of the bale. As is apparent from FIG. 2, the rollers 60 and 61 are in their lowermost position when the bale is started, while the rollers 60 and 61 are in their uppermost position when the bale reaches full size, as shown in FIG. 3, wherein the bale is indicated by the numeral 122. As previously described, as the bale grows, the roller 90 moves rearwardly to accommodate the increase in bale size, the cylinders 86 allowing free movement of the rear gate assembly. As is apparent from FIG. 3 the rollers 47 and 48 support the lower conveyor so that the bale 118 is resting on the rollers 47 and 48 as it nears its completion. Once the bale reaches its full size, the operator actuates the cylinders 86, which can be connected to a hydraulic power source and control valving on the tractor in the conventional manner, so that the cylinders swing the gate assembly rearwardly and upwardly to the position shown in FIG. 4. When the rear gate assembly is in its raised position, the lower conveyor 43 discharges the bale out the rear of the machine. After the bale 122 clears the machine, the operator retracts the cylinders 86 to move the gate assembly to its original position, as shown in FIG. 2, so that another bale can be started.

We claim:

1. A machine for forming large cylindrical bales of crop material such as hay or the like comprising: a mobile main frame having opposite, upright, fore and aft sides defining a baling chamber therebetween; a crop delivery means carried by the frame and adapted to remove the crop from the field as the machine advances and delivers it rearwardly to the baling chamber in a mat; a bale forming mechanism disposed between the opposite sides and including a lower conveyor means generally below the path of crop material when it is delivered from the delivery means and adapted to support the underside of the mat of crop material and the bale formed in the baling chamber above the ground and an upper endless conveyor means spanning the baling chamber, the upper conveyor means having a portion opposite the lower conveyor means to form a baling zone therebetween wherein the mat of material is rolled into a cylindrical bale; and a rear gate assembly including a first pair of interconnected parallel arms pivotally connected to the opposite sides of the machine for swinging in unison in vertical arcs about a common transverse axes, a second pair of parallel arms respectively pivotally connected to the first arms for swinging in vertical arcs about a transverse axis, a first transverse roller extending between the second arms parallel to the pivot axis of the second arms and defining the rearward end of the baling zone, the first and second pairs of arms swinging rearwardly so that the roller moves rearwardly as a bale grows in the baling zone, the upper conveyor means being trained around said roller, a linkage means connecting the second pair of arms to the frame so that the first roller moves in a path generally parallel and adjacent to the lower conveyor means as the bale grows, and power means selectively operative to swing the gate assembly arms upwardly and rearwardly so that the first roller is spaced above the lower conveyor means to permit the rearward discharge of a formed bale.

2. The invention defined in claim 1 wherein the main frame includes a pair of vertical frame elements on opposite sides of the frame and the first pair of arms are respectively pivotally connected to a central portion of the vertical frame elements.

3. The invention defined in claim 2 wherein the main frame includes a pair of fore and aft frame elements crossing the respective vertical frame elements on opposite sides of the baling chamber, a transverse frame member interconnecting the forward ends of the fore and aft frame elements above the crop delivery means, and a central fore and aft tongue extending forwardly from the transverse frame member.

4. The invention defined in claim 1 and including a transverse rotary stripper element mounted on the main frame and disposed above the mat of material delivered to the baling zone adjacent to the upper conveyor means at the forward end of the baling zone.

5. The invention defined in claim 4 wherein the crop delivery means includes a pair of transverse, oppositely rotating vertically spaced, compressor rolls mounted on the main frame and adapted to pass the mat of material rearwardly therebetween and the stripper element comprises a transverse roller rearwardly adjacent to the upper compressor roll.

6. The invention defined in claim 1 wherein the rear gate assembly includes a second transverse roller rotatably mounted on and extending between the second pair of arms and disposed above and rearwardly of the first roller during the baling forming operation.

7. The invention defined in claim 1 wherein the lower conveyor means includes a generally horizontal upper run, and including a pair of generally fore and aft, horizontal guide elements on opposite side of the frame adjacent to the upper run of the lower conveyor, the gate assembly including follower means on the lower ends of the second arms adapted to engage the guide elements to maintain the first roller in a predetermined path as it moves rearwardly as the bale grows.

8. The invention defined in claim 1 wherein the second pair of arms are pivotally connected to the first pair of arms intermediate the opposite ends of the second pair of arms and the linkage means comprises a pair of links respectively extending between the upper ends of the second arms and the main frame.

9. The invention defined in claim 8 wherein adjustment means are provided in each link to vary the effective length of the link and thereby vary the path of movement of the lower ends of the second arms and the first roller carried thereby as the gate assembly swings rearwardly.

10. A machine for forming large cylindrical bales of crop materal such as hay or the like comprising: a mobile main frame having opposite upright fore and aft sides defining a baling chamber therebetween; a crop delivery means carried by the frame and adapted to remove the crop from the field and deliver it rearwardly as the machine advances; a pair of transverse, oppositely rotating compressor rolls mounted on the frame rearwardly of the crop delivery means and adapted to receive the crop therefrom and deliver it rearwardly between the rolls in a mat; a lower conveyor means mounted on the frame generally below the path of crop material delivered from the compressor rolls and adapted to support the underside of the mat of crop material and a bale formed in the baling chamber above the ground; an upper endless conveyor means trained around a plurality of transverse rollers extending between the opposite frame sides, the upper conveyor means including a portion opposite the lower conveyor means to form a baling zone therebetween wherein the mat of material is rolled into a cylindrical bale after it leaves the compressor rolls; a transverse stripper roller extending between the opposite frame sides at the forward end of the baling zone rearwardly adjacent to the upper compressor roll and adjacent to the underside of the upper conveyor means at the forward end of the baling zone to strip the crop material from the upper conveyor means before it leaves the baling zone; a rear gate assembly on the main frame, defining the rearward end of the baling chamber and including a pair of arm means carrying a transversely extending lower rear roller at their lower ends about which the upper endless conveyor means is trained, the transverse lower rear roller forming the rearward end of the baling zone and moving rearwardly with the arm means as the bale increases in size; and means operative between the main frame and the gate assembly to raise the gate assembly and move said arm means and the roller carried thereby upwardly and rearwardly to permit the rearward discharge of a bale from the baling zone.

11. The invention defined in claim 10 wherein each arm means includes a first arm having its forward end pivotally connected to the frame for swinging in a vertical arc and a second arm pivotally connected to the rearward end of the first arm to permit swinging of the second arm relative to the first arm in a vertical arc, the lower rear roller being carried between the lower ends of the second arms of the respective arm means.

* * * * *